United States Patent Office 3,823,158
Patented July 9, 1974

3,823,158
COMPOUNDS CONTAINING AN IMIDE LINKAGE
John K. Allen, Batavia, Ill., assignor to
Standard Oil Company, Chicago, Ill.
No Drawing. Continuation-in-part of abandoned application Ser. No. 770,383, Oct. 24, 1968. This application Mar. 8, 1971, Ser. No. 122,100
Int. Cl. C07d 27/52
U.S. Cl. 260—326 N
4 Claims

ABSTRACT OF THE DISCLOSURE

Reaction products of polyarylpolyisocyanates and an anhydride of an aliphatic dicarboxylic acid, said anhydride having from 3-4 carbon atoms, phthalic anhydride or the completely halogenated derivatives thereof or chlorendic anhydride are disclosed for use in rigid foam compositions, surface coatings and the like.

This application is a continuation-in-part application of Ser. No. 770,383, filed Oct. 24, 1968 by the same inventor and currently abandoned.

BACKGROUND OF THE INVENTION

This invention relates to novel compounds containing imide linkages which are formed by reacting polyarylpolyisocyanates with selected carboxylic acid anhydrides.

Polyarylpolyisocyanates find use as constituents in polyurethane and polyurethane-type foam compositions, both rigid and flexible. Trimers of isocyanates, known as cyanurates, are recognized as distinct compositions and can be further polymerized to produce foamed compositions having utilities as fire resistant insulating materials. Isocyanate-polyol prepolymers are prepared by mildly reacting excess isocyanate with a polyol. Prepolymers may be combined with water to produce foams or they may be reacted with extenders such as 1,4-butanediol, 3,3'-dichloro-4,4'-diamino-diphenylmethane or the bis(beta-hydroxyethyl) ether of hydroquinone to form elastomers which are frequently used to make cast articles. Isocyanates "blocked" by reacting with a phenol are used in industrial coatings such as wire coatings.

I have now discovered a new class of compounds obtained by reacting polyarylpolyisocyanates with an anhydride of an aliphatic dicarboxylic acid said anhydride having from 3-4 carbon atoms, phthalic anhydride or the completely halogenated derivatives thereof or chlorendic anhydride, to form molecules containing both imido and isocyanato functional groups. These novel compounds may be substituted for isocyanates in many commercial applications and result in products of equal or superior properties. Improvements in flame resistance and fire retardance are especially noticeable. One of the most advantageous uses for my new compounds is in the preparation of rigid cellular plastic compositions to which improved flame resistance is generally imparted.

SUMMARY OF THE INVENTION

The compositions of this invention comprise the reaction products of polyarylpolyisocyanates and an anhydride of an aliphatic dicarboxylic acid, said anhydride having from 3-4 carbon atoms, phthalic anhydride or the completely halogenated derivatives thereof or chlorendic anhydride. Generally a polyarylpolyisocyanate having two or more isocyanate groups per molecule may be reacted with the aforelisted anhydride of dicarboxylic acid. The reaction is at atmospheric pressure and at a temperature of between about 150–300° C. Time of the reaction depends on the product viscosity desired.

DETAILED DESCRIPTION AND EXAMPLES

Polyarylpolyisocyanates suitable for the preparation of the compounds of this invention are characterized by either a structure having two benzene or methyl-, ethyl-, or propyl-substituted benzene rings linked either directly or bridged by a carbonyl, sulfoxide, sulfone or ether group; or by a structure having 2–10 benzene or methyl-, ethyl-, or propyl-substituted benzene rings linked by alkylene groups of from 1–3 carbon atoms, said benzene rings having one isocyanate functional group per ring, and an anhydride of an aliphatic dicarboxylic acid, said anhydride having from 3–4 carbon atoms, phthalic acid anhydride or the completely halogenated derivatives thereof, or chlorendic anhydride at a temperature between 150° C. and 300° C. and in a weight ratio of said polyarylpolyisocyanate to said acid anhydride of about 2:1 to 10:1. These polyarylpolyisocyanates contain at least two aromatic rings, each ring being substituted by at least one isocyanato group. The aromatic rings may be suitably interconnected by one or more methylene, propylene, carbonyl, sulfoxide, sulfone or ether linkages. Isocyanate-substituted biphenyls are also suitable. The aromatic rings of any of the above compounds may be additionally substituted by ethyl, methyl or propyl groups. Specific examples of suitable polyarylpolyisocyanates for use with the invention include: polymethylene polyphenylisocyanates having from 2 to 10 benzene rings and liquid mixtures at room temperature of polymethylene polyphenylisocyanate with one or more of the following polyarylpolyisocyanates: 4,4'-diphenylmethylene diisocyanate; diphenylmethylene 3,3'-diisocyanate; diphenyl diisocyanate; diphenylsulfone diisocyanate; diphenylsulfide diisocyanate; diphenyl sulfoxide diisocyanate; and diphenylpropane diisocyanate. Polymethylene polyphenylisocyanates having an average benzene ring content of about 2.1 to 3.5 per molecule are particularly suitable isocyanates.

Anhydrides suitable for use in preparing the compounds of this invention may be generally described as anhydrides of carboxylic acids containing two carboxy functions. The carboxylic acids may be either aromatic or aliphatic and may contain substituents such as halogen in addition to the carboxy functions. Suitable anhydrides include: phthalic anhydride, tetrachlorophthalic anhydride, tetrabromophthalic anhydride, maleic anhydride, malonic anhydride, succinic anhydride, chlorendic anhydride (Diels-Alder reaction product of hexachlorocyclopentadiene and maleic anhydride). Halogen containing anhydrides are generally preferred and tetrabromophthalic anhydride is especially preferred. These anhydrides when once reacted with an isocyanate group or a polyarylpolyisocyanate are incapable of further reaction and thus extension of the system into polymeric form.

The imide isocyanate-anhydride reaction products of this invention are prepared by combining the two components in a stirred vessel in the presence of added heat until reaction occurs. It is advantageous to employ $N_2$ blanketing although the reaction may be conducted in open atmosphere. Ordinarily the reaction proceeds satisfactorily without a catalyst.

Reaction temperature may vary suitably between about 210–300° C. Preferred temperatures vary with the particular reactants but tend generally to be in the range 210–220° C. As can be seen in Table IV at temperatures below 210° C. or in the range 100° C.–120° C. no imides are formed.

Product viscosity increases with increasing extent of reaction, and by continuing the reaction for a sufficient length of time a solid product may be produced. A given reaction is conducted for a length of time suitable to achieve a product having the viscosity desired.

Viscosities of the products may also be controlled by the ratios of reactants employed.

For liquid products of medium viscosities which are principally used in rigid foam formulations, it is frequently preferred to react about 2 weight parts of the isocyanate with 1 weight part of the anhydride and subsequently to dilute the product to the desired viscosity with additional isocyanate. The two-step procedure produces a product having a lower viscosity than a one-step product having the same final weight ratio of isocyanate to anhydride.

Further to illustrate my invention the following examples are included which are not intended to be limitative.

EXAMPLE I

Adducts were prepared from a variety of polyaryl-polyisocyanates and dicarboxylic acid anhydrides. Reaction conditions and adduct formulations are shown in Table I.

The adducts were prepared in a 2 liter stainless steel beaker fitted with an aluminum foil cover. In each preparation the reactants were stirred and heated to 500° F., held ot 500° F. for the length of time shown and cooled to room temperature.

The isocyanates employed are all polymethylene polyphenylisocyanates having the following functionalities (functional groups per molecule) and equivalent weights:

| Isocyanate | Functionality | Equivalent weight |
|---|---|---|
| Mondur MR | 2.5–2.7 | 132 |
| PAPI | 3.0 | 133.5 |
| Isonate 390P | 2.2–2.3 | 130 |
| NCO–120 | 3.1–3.2 | 133 |
| 7418 | 3.3–3.4 | 140 |
| Isonate 500 | 3 | 140.8 |
| Isonate 125MF | 2.0 | 125 |
| NCO–10 | 2.3 | 133 |

Polyfunctional carboxylic acid anhydrides employed in the adducts are identified by the following symbols:

Symbol: | Anhydride name
Br$_4$PAN | Tetrabromophthalic anhydride.
Cl$_4$PAN | Tetrachlorophthalic anhydride.
TMA | Phthalic anhydride.
AMA | Trimellitic anhydride.
ClAN | Chlorendic anhydride.

TABLE I

| Adduct number | Isocyanate type | Anhydride type | Isocyanate/anhydride weight ratio | Heat-up time (min.) to 500° F. | Time held at 500° F. | Adduct viscosity (cp. 70–75° F.) |
|---|---|---|---|---|---|---|
| 12 | MR | Br$_4$PAN | 2/1 | 18 | 0 minutes | Very viscous. |
| 20 | MR | Br$_4$PAN | 5/1 | 17.6 | do | 121,000. |
| 26 | Papi | Br$_4$PAN | 5/1 | 16.3 | do | Very viscous. |
| 27 | 390P | Br$_4$PAN | 5/1 | 15.6 | do | Some solid separated. |
| 28 | NCO 120 | Br$_4$PAN | 5/1 | 17.8 | do | Very viscous. |
| 29 | 7418 | Br$_4$PAN | 5/1 | 17.0 | do | 980,000. |
| 30 | Isonate 500 | Br$_4$PAN | 5/1 | 14.0 | do | Very viscous. |
| 31 | 125MF | Br$_4$PAN | 5/1 | 20.5 | do | Some solid separated. |
| 25 | MR | PAN | 20/1 | 16.5 | do | 650. |
| 55 | 390P | Cl$_4$PAN | 2/1 | 14.7 | 15 minutes | Solid. |
| 58 | 390P | Cl$_4$PAN | 5/1 | 19.0 | do | Do. |
| 59 | 390P | Cl$_4$PAN | 5/1 | | 30 minutes | 950. |
| 48 | 390P | Br$_4$PAN | 4/1 | 16.5 | 5 minutes | 48,500. |
| 37 | 125MF | Br$_4$PAN | 5/1 | 20.4 | 15 minutes | 400. |
| H–8 | NCO–10 | ClAN | 2/1 | (¹) | 1 hour ² | Solid precipitated. |
| H–10 | NCO–10 | ClAN | 2/1 | (³) | 2 hours ² | 18,900. |
| RW 47 | NCO–10 | ClAN | 5/1 | (⁴) | 4 hours ⁵ | 780. |

¹ Heat-up time to 410° F. was 38 min.
² At 410° F.; reaction was carried out in a 1 l. flask.
³ Heat-up time to 410° F. was 35 mn.
⁴ Heat-up time to 392° F. was 30 min.
⁵ At 392° F.; reaction was carried out in a 1 l. flask.

EXAMPLE II

The effects of reaction time and temperatures on the reaction products of this invention are illustrated by the following data. In each case two parts of the Isonate 390P isocyanate were reacted with one part tetrabromophthalic anhydride. At the end of the reaction time three additional parts of Isonate 390P were blended into the hot reaction product.

TABLE II

| Adduct number | Reaction Temp. (° C.) | Reaction Time (hrs.) | Adduct viscosity (cp.) | Storage time (days) | Precipitation |
|---|---|---|---|---|---|
| 101 | 205 | 8 | 440 | 19 | L |
| 102 | 205 | 10 | 505 | 19 | L |
| 103 | 205 | 12 | 1,600 | 15 | N |
| 104 | 205 | 14 | 5,200 | 15 | S |
| 99 | 210 | 5 | 450 | 20 | M |
| 100 | 210 | 6 | 470 | 20 | M |
| 97 | 210 | 7 | 1,075 | 21 | N |
| 98 | 210 | 10 | 2,150 | 21 | S |
| 105 | 215 | 5 | 1,200 | 14 | N |
| 95 | 215 | 7 | 2,050 | 26 | S |
| 96 | 215 | 10 | 14,400 | 26 | S |
| 91 | 220 | 3 | 570 | 28 | M |
| 93 | 220 | 4 | 1,450 | 27 | S |
| 94 | 220 | 5 | 4,250 | 27 | S |
| 106 | 220 | 6 | 11,000 | 14 | S |

NOTE.—L=Large; M=Medium; S=Small; N=None.

EXAMPLE III

Six hundred pounds of NCO–10 isocyanate, identified in Example I was charged to a 200 gallon stainless steel reactor fitted with a 44 r.p.m. stirrer and maintained under a nitrogen blanket flowing at 50 cubic feet per hour. Three hundred pounds of tetrabromophthalic anhydride were added and the temperature raised to 410° F. The reactor was maintained under these conditions for 7 hours after which the hot reaction mixture was diluted with 900 pounds of cold (ambient temperature) NCO–20, a polyphenylpolyisocyanate having a functionality of 2.6 and an equivalent weight of 133.

The diluted reaction mixture was cooled to 200° F. and discharged into storage. No precipitation occurred during cooling of the product to room temperature. Viscosity at 74° F. was 8,000 cp. Infrared analysis indicated that approximately 50% of the anhydride groups had reacted to form imide.

EXAMPLE IV

Fire-resistant cellular plastic foams were prepared with the reaction product of Example III. These foams were rated in ASTM test E 84–61 for Surface Burning Characteristics of Building Materials. The foams received a flame spread rating satisfying current commercial standards for approved building materials.

The foams were prepared by combining, in the proportions indicated, the components given in Table III below. Symbols used in Table III have the following meanings:

51B: The isocyanate-anhydride reaction product of Example III.

DC–195: A siloxane glycol block copolymer surfactant.

DBTDA: Dibutyltin diacetate.

C-22-R: A chlorine-containing organophosphorous compound used as a flame-retardant having the following structure:

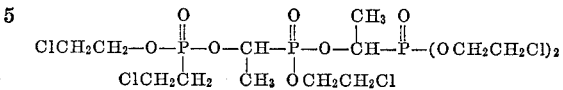

TMA: Trimellitic anhydride.

S6-91: A reaction product of 5 parts of a propoxylated sucrose amine polyol (E.W. 94), 5 parts of poly(ethyleneglycol) (E.W. 200) and 4 parts chlorendic anhydride.

2406A: A propoxylated hexitol polyol manufactured by Atlas and having an equivalent weight of 88, a functionality of 6 and a hydroxyl number of 640.

S6-67: A reaction product of 2 parts of a propoxylated pentaerythritol polyol (E.W. 100) and 1 part of tetrabromophthalic anhydride.

PEP-450: A propoxylated pentaerythritol polyol manufactured by Wyandotte and having an equivalent weight of 100, a functionality of 4 and an hydroxyl number of 561.

I claim:

1. The reaction products prepared by reacting a mixture consisting essentially of a polyarylpolyisocyanate consisting of 2–10 benzene or methyl-, ethyl-, or propyl-substituted benzene rings linked by methylene groups, said benzene rings having one isocyanate functional group per ring, and a compound selected from the group consisting of phthalic anhydride, tetrachlorophthalic anhydride, tetrabromophthalic anhydride, and chlorendic anhydride at a temperature between 150° C. and 300° C. and in a weight ratio of said polyarylpolyisocyanate to said anhydride of about 2:1 to 10:1.

2. The compound of Claim 1 wherein the reaction temperature is between about 200° C. and about 220° C. and the weight ratio of polyisocyanate to acid anhydride is between 2:1 and 10:1.

3. The compound of Claim 1 wherein the polyarylpolyisocyanate is a mixture of materials characterized by having 2–10 benzene rings linked by methylene groups, said benzene rings having one isocyanate functional group per ring, and the acid anhydride is perbromophthalic acid anhydride.

4. A process for preparing a polyarylpolyisocyanate-dicarboxylic acid-anhydride reaction product having a viscosity suitable for use in preparation of a rigid, cellular, plastic foam comprising:

(1) reacting at a temperature from about 150° C. to 300° C., one part by weight of the dicarboxylic acid anhydride of Claim 1 with about 1 to about 2 parts by weight of the polyarylpolyisocyanate of Claim 1; and (2) diluting the hot reaction mixture with sufficient polyarylpolyisocyanate of Claim 1 to achieve a weight ratio of polyarylpolyisocyanate to dicarboxylic acid anhydride of from about 2:1 to about 10:1.

References Cited
UNITED STATES PATENTS

| | | | |
|---|---|---|---|
| 3,314,923 | 4/1967 | Muller et al. | 260—78 |
| 3,445,477 | 5/1969 | Muller et al. | 260—326 |

FOREIGN PATENTS

| | | | |
|---|---|---|---|
| 1,058,236 | 2/1967 | Great Britain | 260—326 |

JOSEPH A. NARCAVAGE, Primary Examiner

U.S. Cl. X.R.

252—8.1; 260—326.5 FM

TABLE III

| Number | Chemical types | | | | Formulation (parts by weight) | | | | | | Evaluation | |
|---|---|---|---|---|---|---|---|---|---|---|---|---|
| | Isocyanate | Polyol | Surfactant | Catalyst | Additive | Polyol | TMA | Surfactant | Catalyst | CFCl₃ | Cure | Flame spread |
| 451A-1.5¹ | 51B | S6-91 / 2406A | DC-195 | DBTDA | C-22-R | 41.7 / 16.7 | 8.3 | 1.67 | 1.67 | 33.4 | 150° F./1.5 hour | 25 |
| 436B-1.5 | 51B | S6-67 / 2406A | DC-195 | DBTDA | C-22-R | 100 / 15 | | 2.0 | 2.0 | 35 | do | 20 |
| 446B-1.5 | 51B | PEP 450 | DC-195 | DBTDA | C-22-R | 15 | | 2.0 | 2.0 | 30 | do | 25 |

TABLE IV

| Adduct reference number | Chemical components | | | | | | Preparation conditions | | Final isocyanate/anhydride weight ratio | Adduct viscosity | | |
|---|---|---|---|---|---|---|---|---|---|---|---|---|
| | Anhydride | | Reactant Isocyanate | | Diluent Isocyanate | | Temperature (°F.) | Time, hrs. | | Temperature (°F.) | Value (cp.) | |
| | Type | Weight (g.) | Type | Weight (g.) | Type | Weight (g.) | | | | | | |
| 129/A | Br₄PAN | 750 | NCO-10 | 1,500 | NCO-20 | 2,250 | 210 | 6 | 5/1 | 74 | 5,800 | Considerable reaction to give cyclic imide. |
| 129/B | Br₄PAN | 750 | NCO-10 | 1,500 | NCO-20 | 2,250 | 120 | 24 | 5/1 | 72 | 1,548 | Solid portion—mainly unreacted tetrabromophthalic anhydride; liquid portion—mainly unreacted isocyanate. |
| 132/A | TMA | 750 | NCO-10 | 1,500 | NCO-20 | 2,250 | 100 | 0.25 | 5/1 | 74 | (²) | Very little, if any, amide or imide formation. |
| 134/A | TMA | 200 | NCO-10 | 2,000 | | | 100 | 1 | 10/1 | 73 | 30,240 | No imide; very small amount of amide. |
| 135/A | TMA | 400 | NCO-10 | 2,000 | | | 100 | 1 | 5/1 | 74 | (²) | Do. |

¹ The product consisted of solid and liquid portions; the viscosity of the liquid portion was determined.
² Solid product.

PO-1050
(5/69)

UNITED STATES PATENT OFFICE
CERTIFICATE OF CORRECTION

Patent No. 3,823,158                    Dated   July 9, 1974

Inventor(s)  John K. Allen

It is certified that error appears in the above-identified patent and that said Letters Patent are hereby corrected as shown below:

Column 3, line 43, under "Symbol:" "TMA" should be --PAN--.
 "     3  "    44 under "Sumbol:" "AMA" should be --TMA--.

Table III, 1st column, 3d down, "446B-1.5" should be --446B-1.5--.

Table IV, 3d column, sub-heading "Reactant isocyante" should be --Reactant isocyanate--.
 "     "   under "Type" in "Reactant isocyanate" column, 3d down, "NOC-10" should be --NCO-10--.

Signed and sealed this 15th day of October 1974.

(SEAL)
Attest:

McCOY M. GIBSON JR.                  C. MARSHALL DANN
Attesting Officer                    Commissioner of Patents